(12) United States Patent
Ishimaru et al.

(10) Patent No.: US 8,681,881 B2
(45) Date of Patent: Mar. 25, 2014

(54) COMMUNICATION SIGNAL GENERATING DEVICE AND COMMUNICATION APPARATUS FOR USE IN COMMUNICATION SYSTEM

(75) Inventors: Kazuhisa Ishimaru, Nagoya (JP); Hiroyuki Mori, Obu (JP); Tomohisa Kishigami, Obu (JP)

(73) Assignees: Denso Corporation, Kariya (JP); Nippon Soken, Inc., Nishio (JP)

( * ) Notice: Subject to any disclaimer, the term of this patent is extended or adjusted under 35 U.S.C. 154(b) by 300 days.

(21) Appl. No.: 13/134,022

(22) Filed: May 26, 2011

(65) Prior Publication Data

US 2011/0293036 A1    Dec. 1, 2011

(30) Foreign Application Priority Data

May 28, 2010   (JP) .................................. 2010-122961

(51) Int. Cl.
*H04B 3/00*   (2006.01)

(52) U.S. Cl.
USPC ........... 375/257; 375/295; 375/222; 375/220; 375/219

(58) Field of Classification Search
CPC ....... H01H 47/10; H01H 33/16; H01H 9/061; H01H 9/42; H01H 33/161
USPC ........................................................ 375/257
See application file for complete search history.

(56) References Cited

U.S. PATENT DOCUMENTS

| 5,559,447 A * | 9/1996 | Rees ................................ 326/30 |
| 6,487,250 B1 | 11/2002 | Kato et al. |
| 2007/0002954 A1 * | 1/2007 | Cornelius et al. ............. 375/257 |

FOREIGN PATENT DOCUMENTS

| JP | 3693877 | 12/2000 |
| JP | 2006-067543 | 3/2006 |
| JP | 2008-292307 | 12/2008 |

OTHER PUBLICATIONS

Office action dated Jul. 3, 2012 in corresponding Japanese Application No. 2010-122961.

* cited by examiner

*Primary Examiner* — Lihong Yu
(74) *Attorney, Agent, or Firm* — Harness, Dickey & Pierce, PLC

(57) ABSTRACT

The communication signal generating device is for use in a communication system where communication signals each of which is set at a first level or a second level are exchanged among a plurality of communication apparatuses through a communication line. The communication signal generating device includes a switching element provided in a communication line to connect the communication line to a ground or a constant voltage source, and a driving means to generate a first communication signal at the first level by turning on the switching element to thereby pass a certain current to the communication line, and generate a second communication signal at the second level by turning off the switching element to thereby pass no current to the communication line. The driving means is configured to gradually increase an output impedance of the switching element during one bit time of the first communication signal.

4 Claims, 3 Drawing Sheets

COMMUNICATION SIGNAL GENERATING DEVICE AND COMMUNICATION APPARATUS FOR USE IN COMMUNICATION SYSTEM

This application claims priority to Japanese Patent Application No. 2010-122961 filed on May 28, 2010, the entire contents of which are hereby incorporated by reference.

BACKGROUND OF THE INVENTION

1. Field of the Invention

The present invention relates to a communication signal generating device included in a communication apparatus for use in a communication system in which communication signals are exchanged among a plurality of communication apparatuses through a signal line.

2. Description of Related Art

As such a communication system, there are known ones having a network structure in which a plurality of communication apparatuses are respectively connected to a plurality of branch lines branched from a trunk line as a common signal line. However, the communication system having such a network structure has a problem in that there occur signal reflections at branch points (connection points) between the trunk line and each branch line, causing the communication signals to have ringing waveforms.

To cope with this problem, it is proposed to control the output impedances of the communication apparatuses outputting the communication signals. For example, refer to Japanese patent No. 3693877 (Patent document 1). The communication system disclosed in Patent document 1 includes digital signal output circuits configured to output signals to a communication line through their respective output buffers, and each of the digital signal output circuits is provided with an output impedance varying section disposed between its output buffer and the communication line. The output impedance varying section operates to shape the waveform of a signal outputted from the output buffer by varying the output impedance of the output buffer in accordance with variation of the level of the signal in order to reduce the high-frequency components of this signal.

However, the communication system as disclosed in Patent document 1 has a problem in that since each of the digital signal output circuits has be provided with the output impedance varying section in addition to the output buffer, the number of components constituting the communication system increases.

SUMMARY OF THE INVENTION

An embodiment provides a communication signal generating device for use in a communication system where communication signals each of which is set at a first level or a second level are exchanged among a plurality of communication apparatuses through a communication line, comprising:

a switching element provided in a communication line to connect the communication line to a ground or a first constant voltage source generating a first constant voltage; and a driving means to generate a first communication signal at the first level by turning on the switching element to thereby pass a certain current to the communication line, and generate a second communication signal at the second level by turning off the switching element to thereby pass no current to the communication line;

wherein the driving means is configured to gradually increase an output impedance of the switching element during one bit time of the first communication signal.

Another embodiment provides a communication apparatus for use in the communication system, including the communication signal generating device recited above.

Other advantages and features of the invention will become apparent from the following description including the drawings and claims.

PREFERRED EMBODIMENTS OF THE INVENTION

Figure 1:
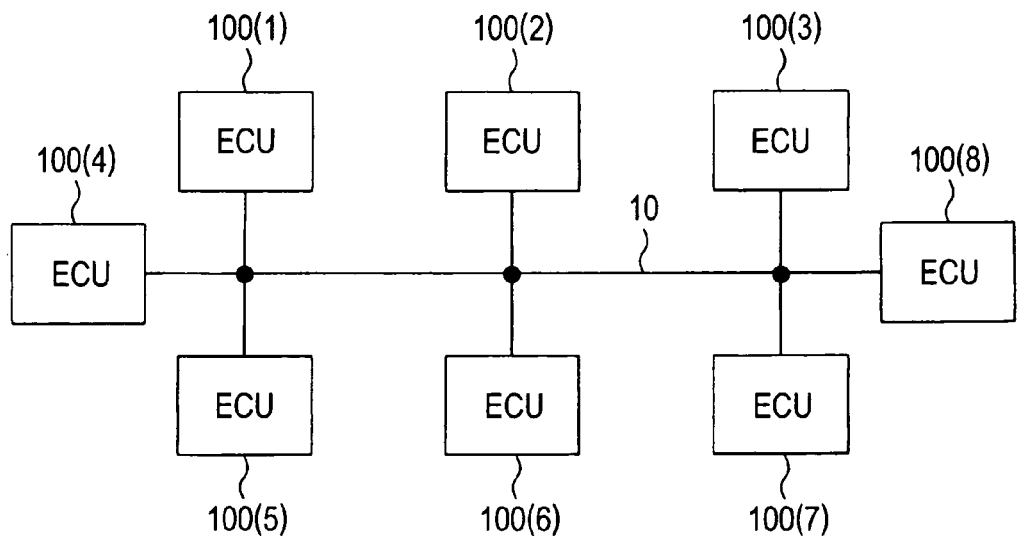
FIG. 1 is a block diagram schematically showing the structure of a communication system including ECUs (Electronic Control Units) as communication apparatuses as a first embodiment of the invention.

FIG. 1 is a block diagram schematically showing the structure of a communication system including ECUs 100(1), 100(2), . . . , as communication apparatuses according to a first embodiment of the invention.

In this communication system, the ECUs 100(1), 100(2), . . . , are connected to a bus 10 as a communication line in order to exchange communication signals thereamong through the bus 10. Here, the communication signal is a one-bit signal at the dominant level or recessive level. In the following, the ECUs 100(1), 100(2), . . . , may be collectively referred to as the ECUs 100.

The communication system, which has the so-called passive star network configuration in which a plurality of ECUs connected to corresponding branch lines branched from a common communication line (a trunk line), uses the CAN (Controller Area Network) standard as its communication protocol for communication among the ECUs 100. More specifically, the bus 10 is a 2-wire bus constituted of a first communication wire (H line) and a second communication wire (L line). The level of a communication signal (the dominant level or recessive level) is represented by the voltage difference (differential voltage) between the first and second communication wires.

Figure 2:
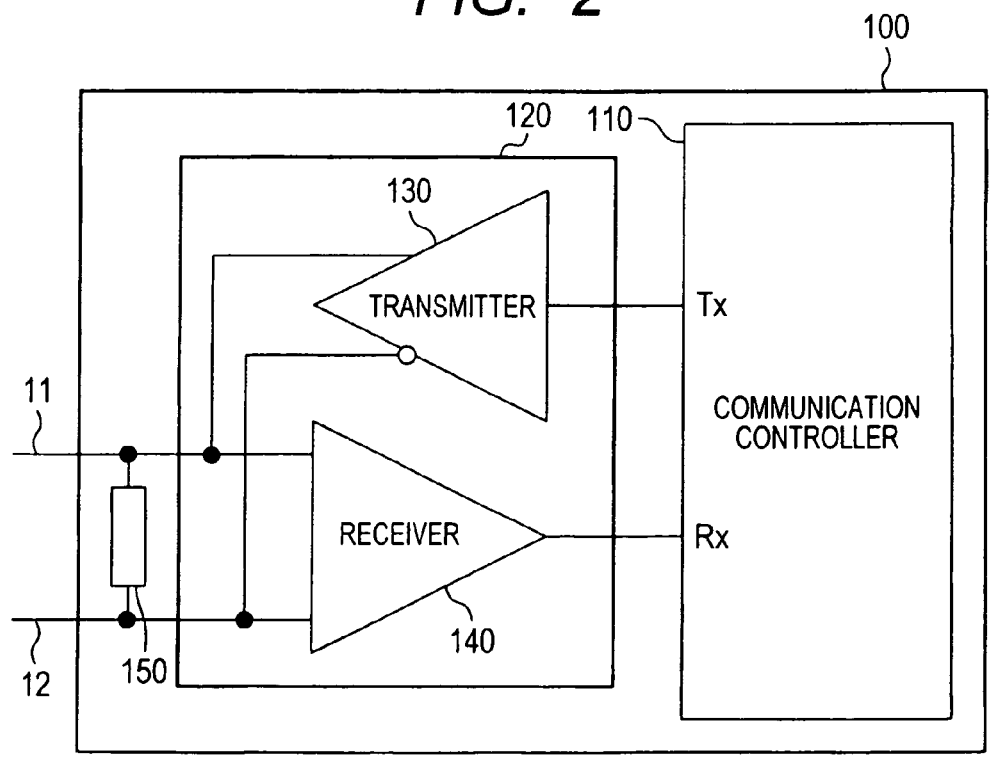
FIG. 2 is a circuit diagram of the ECU.

Next, the structure common to all the ECUs 100 is described. FIG. 2 is a circuit diagram of the ECU 100.

The ECU 100 includes a communication controller 110 and a transceiver 120. In this embodiment, two of the ECUs 100 which are most distant from each other (ECU 100(4) and ECU 100(8) in this embodiment) are respectively provided with a termination resistor 150 connected between the first and second communication wires 11 and 12.

The communication controller 110, which is implemented by a microcomputer including a CPU, a ROM and a RAM, is provided with a Tx terminal (transmission terminal) an Rx terminal (reception terminal). The Tx terminal is connected to a transmitter 130 as a communication signal generating device (explained later) of the transceiver 120, and the Rx terminal is connected to a received 140 (explained later) of the transceiver 12. The communication controller 110 performs a communication control process for outputting a transmission signal (Tx signal) at the low or high level through the Tx terminal, and receive a reception signal (Rx signal) at the low or high level through the Rx terminal.

The transceiver 120, which is an interface IC for mediating between the bus 10 and the communication controller 110, includes the transmitter 130 and the receiver 140. Each of the transmitter and the receiver 140 is connected to both the first and second communication wires 11 and 12.

The transmitter 130 converts the transmission signal outputted from the Tx terminal of the communication controller 110 into a communication signal (differential signal) to be transmitted to the first and second communication wires 11 and 12. More specifically, when the transmission signal is at the low level, it is converted into a recessive-level communication signal by bringing the voltage difference (differential voltage) across the termination resistor 150 to substantially 0 by refraining from passing a current to the first communication wire 11 and refraining from drawing a current from the second communication wire 12. On the other hand, when the transmission signal is at the high level, it is converted into a dominant-level communication signal by producing a certain voltage difference (differential voltage) across the termination resistor 150 by passing a current to the first communication wire 11 and drawing a current from the second communication wire 12.

The receiver 140 detects a communication signal received through the first and second wires 11 and 12, and outputs a resultant reception signal to the Rx terminal of the communication controller 110.

Figure 3:
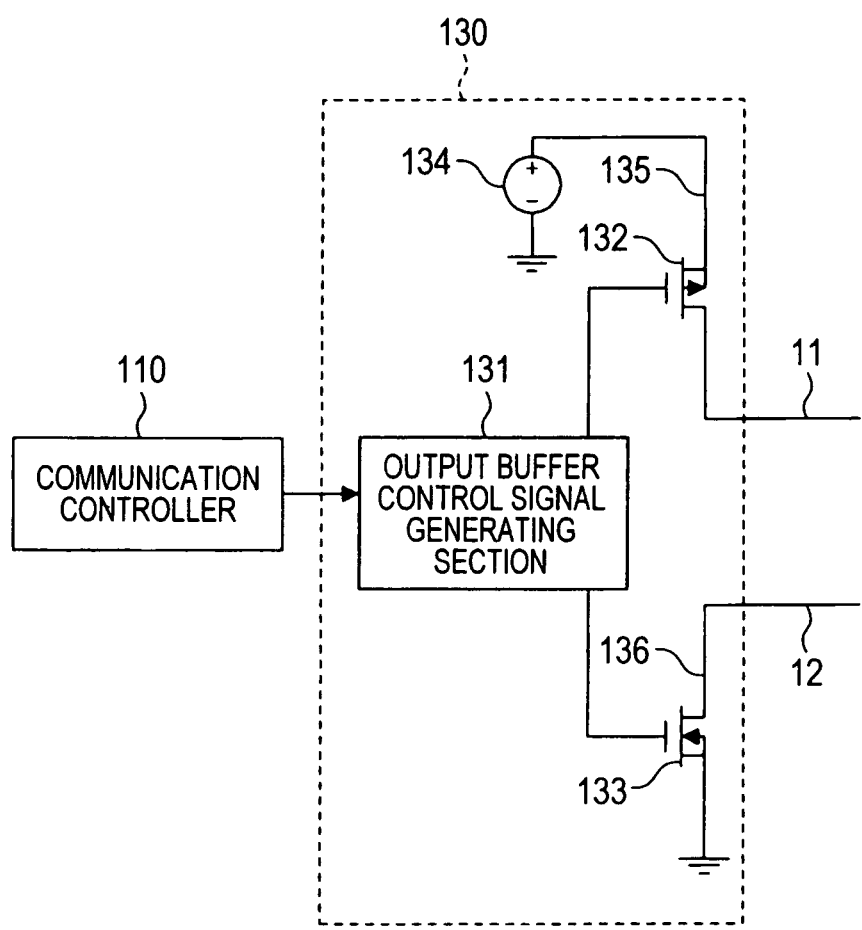
FIG. 3 is a circuit diagram of a transmitter included in the ECU.

Next, the structure of the transmitter 130 is described in detail with reference to FIG. 3.

The transmitter 130 includes an output buffer control signal generating section 131 as a switching element driving means which receives a transmission signal outputted from the communication controller 110, and transistors 132 and 133 as switching elements functioning as an output buffer.

The transistor 132 is a P-channel MOSFET provided in a connection line 135 connecting the first communication wire 11 to a constant voltage source 134 to generate 5 V. The transistor 132 is connected to the constant voltage source 134 at its source, connected to the first communication wire 11 at its drain and connected to the output buffer control signal generating section 131 at its gate. The transistor 133 is an N-channel MOSFET provided in a connection line 136 connecting the second communication wire 12 to the ground at 0 V. The transistor 133 is connected to the second communication wire 12 at its drain, connected to the ground at its source and connected to the output buffer control signal generating section 131 at its gate. The buffer control signal generating section 131 incorporates a clock device, and applies a drive signal (buffer control signal) to the gate of each of the transistors 132 and 133 in accordance with a transmission signal received from the communication controller 110.

More specifically, the communication controller 110 outputs a transmission signal at the low level to transmit a recessive-level communication signal to the bus 10, and outputs a transmission signal at the high level to transmit a dominant-level communication signal to the bus 10.

The output buffer control signal generating section 131 outputs a drive signal at the high level to the transistor 132 and outputs a drive signal at the low level to the transistor 133, while a transmission signal at the low level (recessive state level) is received from the communication controller 110. In this state, both the transistor 132 and 133 are off (if any signal transmitted from the other ECUs is not considered), and accordingly the differential voltage between the first and second communication wires 11 and 12 is at the low level (the recessive state level of 0 or around 0 V)

On the other hand, while a transmission signal at the high level (dominant state level) is received from the communication controller 110, the output buffer control signal generating section 131 outputs a drive signal at the low level to the transistor 132 and outputs a drive signal at the high level to the transistor 133. In this state, both the transistor 132 and 133 are on (if any signal transmitted from the other ECUs is not considered), and accordingly the differential voltage between the first and second communication wires 11 and 12 is at the high level (the dominant state level).

In this embodiment, the output buffer control signal generating section 131 controls the gate voltage of each of the transistors 132 and 133 in order to reduce a ringing in the waveform of a communication signal caused when it changes from the dominant level to the recessive level. More specifically, the output buffer control signal generating section 131 gradually increases the impedance (the on-resistance) of each of the transistors 132 and 133 during one bit time in which the differential voltage is set at the high level in order to reduce the high-frequency components of the communication signal. That is, in this embodiment, the ringing is reduced by gradually increasing the impedance of the output buffer.

Figure 4:
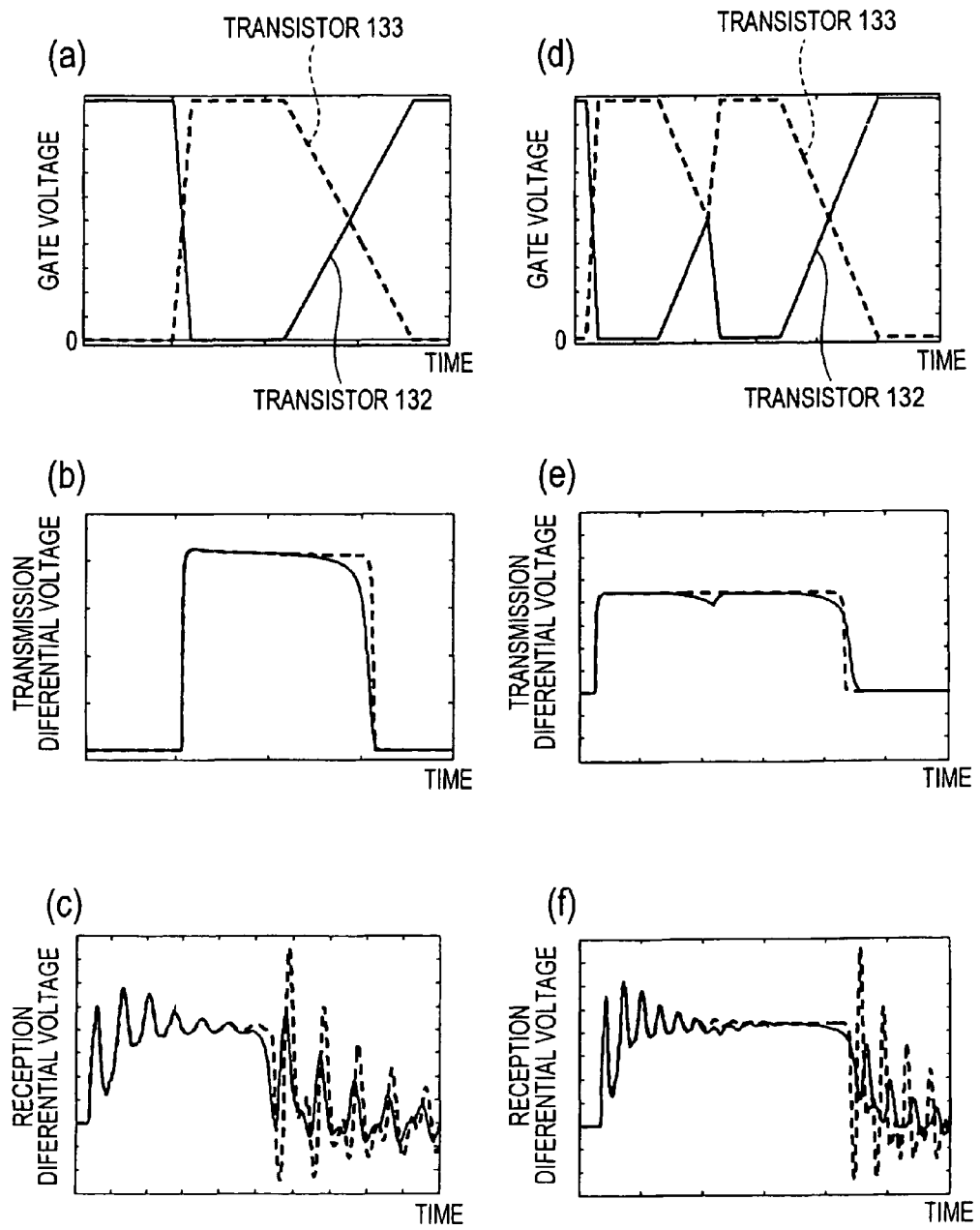
FIG. 4 is a diagram showing waveforms of gate voltages of transistors as switching elements included in the transmitter, and transmission and reception differential voltages as transmission signals in the communication system.

Further explanation is given on this point with reference to FIG. 4. The section (a) of FIG. 4 is a diagram showing the waveform of the gate voltage when the transmission signal is changed in the order of the low level, high level and low level. The section (b) of FIG. 4 is a diagram showing the waveform of the transmission differential voltage when the transmission signal is changed in the order of the low level, high level and low level. The section (c) of FIG. 4 is a diagram showing the waveform of the reception differential voltage when the transmission signal is changed in the order of the low level, high level and low level. The section (d) of FIG. 4 is a diagram showing the waveform of the gate voltage when the transmission signal is changed in the order of the low level, high level and low level. The section (e) of FIG. 4 is a diagram showing the waveform of the transmission differential voltage when the transmission signal is changed in the order of the low level, high level and low level. The section (f) of FIG. 4 is a diagram showing the waveform of the reception differential voltage when the transmission signal is changed in the order of the low level, high level and low level.

As shown in the section (a) of FIG. 4, when the transmission signal outputted from the communication controller 110 changes from the low level (recessive state level) to the high level (dominant state level), the output buffer control signal generating section 131 changes the drive signal applied to the gate of the transistor 132 as the gate voltage from the high level to the low level, and changes the drive signal applied to the gate of the transistor 133 as the gate voltage from the low level to the high level. Thereafter, regardless whether the next bit of the transmission signal is at the low level or high level, the output buffer control signal generating section 131 gradually (continuously in this embodiment) increases the gate voltage of the transistor 132, and gradually (continuously in this embodiment) decreases the gate voltage of the transistor 133, so that the impedance of the output buffer gradually increases.

Accordingly, the communication signal transmitted to the bus 10 is gradually changed from the dominant state level to the recessive state level within the range defining the dominant state (within the range in which the differential voltage is not below a predetermined threshold, for example). As a result, when the next bit is at the low level (recessive state level), as shown in the section (b) of FIG. 4, the waveform of the differential voltage (shown by the solid line) transmitted from the ECU 100 is less angular and accordingly contain less high-frequency components during change from the high level (dominant state) to the low level (recessive state) compared to the case where the impedance of the output buffer is not changed gradually (see the broken line). Accordingly, as shown in the section (c) of FIG. 4, the differential voltage (shown by the solid line) of the transmission signal received by any other ECU 100 has a waveform with less ringing compared to the case where the impedance of the output buffer is not changed gradually (see the broken line).

When the next bit of the transmission signal is at the high level (dominant state level), that is, when the high-level state continues, as shown in the section (d) of FIG. 4, the output buffer control signal generating section 131 detects discontinuity between adjacent bits based on the clock to reset the gate voltage of each of the transistors 132 and 133 at the end of one bit time to the value at the start of this one bit time, and thereafter performs the control to gradually increase the impedance of the output buffer again. That is, when the high-level state (dominant state) continues, the control to gradually increase the impedance of the output buffer is repeated for each bit time.

As a result, when the transmission signal is changed to the low level (recessive state level) thereafter, as shown in the section (e) of FIG. 4, the waveform of the differential voltage (shown by the solid line) transmitted from the ECU 100) is less angular and accordingly contains less high-frequency components during change from the high level (dominant state level) to the low level (recessive state level) compared to the case where the impedance of the output buffer is not changed gradually (see the broken line). Accordingly, as shown in the section (f) of FIG. 4, the differential voltage (shown by the solid line) of the transmission signal received by any other ECU 100 has a waveform with a less ringing compared to the case where the impedance of the output buffer is not changed gradually (see the broken line).

The above described embodiment of the invention provides the following advantages. The communication system of this embodiment is configured such that the output buffer control signal generating section 131 of the ECU 100 gradually increases the impedance of the output buffer (the transistors 132 and 133) during one bit time of the communication signal representing the dominant state. Accordingly, since the high-frequency components of the communication signal are reduced during change from the dominant state to the recessive state, the ringing of the waveform of the communication signal during change from the dominant state to the recessive state can be reduced.

In the communication system where the communication signal representing the dominant state is generated by passing a current to the bus 10, and the communication signal representing the recessive state is generated by passing no current to the bus 10, a ringing which can be a cause of misdetection of a reception signal is prone to appear during change from the dominant state to the recessive state. The reason for this is in difference between the impedance of the bus 10 and the impedance of the output stage of the transmitter 130. More specifically, the output stage of the transmitter 130 is in the high-impedance state during the recessive state, and in the low-impedance state during the dominant state. Since a reflection signal becomes larger with the increase of the difference between the impedance of the bus 10 and the impedance of the transmitter 130, the wave height of the reflection signal during change from the dominant state to the recessive state is larger than that during change from the recessive state to the dominant state.

Accordingly, the ECU 100 of the communication system of this embodiment is configured to gradually increase the impedance of the output buffer during one bit time of the communication signal representing the dominant state, because the ringing which can be a cause of misdetection of a reception signal and therefore should be eliminated may appear during change from the dominant state to the recessive state.

In this embodiment, instead of providing a specific structure for varying the output impedance of the output buffer 10 between the output buffer and the bus 10, the impedance of the output buffer 10 itself is gradually increased. In other words, this embodiment is configured to generate a communication signal having a waveform containing less high-frequency components, instead of shaping the generated communication signal to reduce its high-frequency components. Accordingly, since it is not necessary to dispose a specific structure to vary the output impedance of the transmitter 130 between the output buffer and the bus 10, it is possible to reduce the ringing without increase of the number of the components of the communication system.

Accordingly, according to this embodiment, it is possible to reduce the size and manufacturing cost of the communication apparatus.

It is a matter of course that various modifications can be made to the above described embodiment as described below.

The above embodiment is configured to gradually increases the impedance of the output buffer from some midpoint of one bit time. However, the impedance of the output buffer may be gradually increased from the start of one bit time.

In the above embodiment, the impedance of the output buffer is varied continuously. However, the impedance of the output buffer may be varied stepwise.

In the above embodiment, the transistors 132 and 133 functioning as an output buffer are respectively disposed in the connection line 135 connecting the first communication wire 11 to the constant voltage source 134, and the connection line 136 connecting the second communication wire 12 to the ground. However, the above embodiment may be modified such that the transistor 133 is provided in a connection line connecting the second communication wire 12 to a constant voltage source generating a voltage different from that generated by the constant voltage source 134 connected to the first communication wire 11.

In the above embodiment, communication signals are exchanged through the two-wire bus. However, the present invention is applicable to a communication system in which communication signals are exchanged through a single wire bus. In this case, one of the structure formed on the side of the first communication wire 11 including the transistor 132 and the constant voltage source 134, and the structure formed on the side of the second communication wire 12 including the transistor 133 and a grounding member may be removed.

In the above embodiment, the impedance of the output buffer is gradually increased during one bit time of the communication signal representing the dominant state. However, the above embodiment may be modified such that the impedance of the output buffer is gradually increased also during one bit time of the communication signal representing the recessive state. According to this modification, it is possible to reduce the ringing of the waveform of the communication signal not only during change from the dominant state to the recessive state but also during change from the recessive state to the dominant state.

Although the communication system of the above embodiment uses the CAN standard as its communication protocol, the present invention is applicable to a communication system which uses a communication protocol different from the CAN standard.

The above explained preferred embodiments are exemplary of the invention of the present application which is described solely by the claims appended below. It should be understood that modifications of the preferred embodiments may be made as would occur to one of skill in the art.

What is claimed is:

1. A communication signal generating device for use in a communication system where communication signals each of which is set at a first level or a second level are exchanged among a plurality of communication apparatuses through a communication line, comprising:
   a switching element provided in a communication line to connect the communication line to a ground or a first constant voltage source generating a first constant voltage; and
   a driving means to generate a first communication signal at the first level by turning on the switching element to thereby pass a certain current to the communication line, and generate a second communication signal at the second level by turning off the switching element to thereby pass no current to the communication line;
   wherein the driving means is configured to, in a case where the first communication signal is generated and subsequently the second communication signal is generated, increase an output impedance of the switching element gradually during one bit time of the first communication signal, and, in a case where the first communication signal is generated two or more times successively, reset the output impedance of the switching element at an end of each one bit time to a value at a start of each one bit time, and thereafter gradually increase the output impedance during each one bit time of the first communication signal.

2. The communication signal generating device according to claim 1, wherein the communication line is a 2-wire bus constituted of a first communication wire and a second communication wire, and the switching element is provided in a first connection line to connect the communication line to the first constant voltage source and in a second connection line to connect the communication line to the ground or a second constant voltage source generating a second constant voltage different from the first constant voltage generated by the first constant voltage source.

3. A communication apparatus including the communication signal generating device as recited in claim 1.

4. A communication apparatus including the communication signal generating device as recited in claim 2.

* * * * *